(12) United States Patent
Genders et al.

(10) Patent No.: US 9,957,620 B2
(45) Date of Patent: May 1, 2018

(54) METHODS FOR THE SIMULTANEOUS ELECTROLYTIC DECARBOXYLATION AND REDUCTION OF SUGARS

(71) Applicant: DYNAMIC FOOD INGREDIENTS CORPORATION, Kirkland, WA (US)

(72) Inventors: J. David Genders, Elma, NY (US); Jonathan A. Stapley, Bellevue, WA (US)

(73) Assignee: DFI USA, LLC, Mercer Island, WA (US)

( * ) Notice: Subject to any disclaimer, the term of this patent is extended or adjusted under 35 U.S.C. 154(b) by 254 days.

(21) Appl. No.: 14/911,810

(22) PCT Filed: Aug. 14, 2014

(86) PCT No.: PCT/US2014/051023
§ 371 (c)(1),
(2) Date: Feb. 12, 2016

(87) PCT Pub. No.: WO2015/023828
PCT Pub. Date: Feb. 19, 2015

(65) Prior Publication Data
US 2016/0194765 A1 Jul. 7, 2016

Related U.S. Application Data

(60) Provisional application No. 61/866,908, filed on Aug. 16, 2013.

(51) Int. Cl.
*C25B 3/02* (2006.01)
*C25B 3/04* (2006.01)
*C25B 9/08* (2006.01)
*C25B 3/00* (2006.01)

(52) U.S. Cl.
CPC .............. *C25B 3/02* (2013.01); *C25B 3/00* (2013.01); *C25B 3/04* (2013.01); *C25B 9/08* (2013.01)

(58) Field of Classification Search
CPC ........................................................ C25B 3/04
See application file for complete search history.

(56) References Cited

U.S. PATENT DOCUMENTS

| | | | | |
|---|---|---|---|---|
| 4,547,273 A * | 10/1985 | Ayers | ........................ | B01J 4/04 |
| | | | | 205/440 |
| 4,950,366 A * | 8/1990 | Jiricny | .................... | C07H 3/02 |
| | | | | 205/348 |
| 4,950,368 A * | 8/1990 | Weinberg | ................ | C25B 3/00 |
| | | | | 205/344 |
| 5,753,097 A | 5/1998 | Sharifian et al. | | |
| 8,845,877 B2 * | 9/2014 | Cole | ......................... | C25B 3/04 |
| | | | | 205/448 |
| 2007/0181437 A1 * | 8/2007 | Stapley | ................ | C07C 29/141 |
| | | | | 205/454 |
| 2011/0236724 A1 * | 9/2011 | Mayer | ............... | H01M 8/04186 |
| | | | | 429/2 |
| 2011/0272291 A1 | 11/2011 | Stapley et al. | | |
| 2016/0024668 A1 * | 1/2016 | Stapley | .................... | C25B 3/02 |
| | | | | 205/346 |

FOREIGN PATENT DOCUMENTS

CN 1185489 A 6/1998

OTHER PUBLICATIONS

International Search Report and Written Opinion for International Application No. PCT/US2014/051023, dated Dec. 17, 2014 (6 pages).

* cited by examiner

*Primary Examiner* — Harry D Wilkins, III
(74) *Attorney, Agent, or Firm* — Brinks Gilson & Lione; Ryan L. Marshall; Jonathan Hartley

(57) ABSTRACT

Methods for simultaneously decarboxylating carbohydrate acids and reducing carbohydrate aldehydes in a divided electrochemical cell having a central compartment separate from the anode and cathode are disclosed using a cation membrane and a bipolar membrane. The improved methods are more cost-efficient and environmentally friendly.

17 Claims, No Drawings

US 9,957,620 B2

METHODS FOR THE SIMULTANEOUS ELECTROLYTIC DECARBOXYLATION AND REDUCTION OF SUGARS

REFERENCE TO EARLIER FILED APPLICATIONS

This application is a 371 national phase of PCT/US2014/051023, filed Aug. 14, 2014, and claims the benefit under 35 U.S.C. § 119(e) of U.S. Provisional Application No. 61/866,908, filed Aug. 16, 2013, the disclosures of which are incorporated, in their entirety, by this reference.

TECHNICAL FIELD

The present disclosure relates to methods of electrolytically decarboxylating sugar acids, electrolytically generating alkali metal, or ammonium hydroxide solutions, and electrolytically reducing sugars into sugar alcohols.

BACKGROUND

A cost-effective method to maintain sugar acid neutralization during a sugar decarboxylation process is described in U.S. Patent Application No. 61/777,890. Therein, the sugar acids can be decarboxylated to produce carbohydrate aldehydes at the anode of a two-compartment electrolytic cell, which can be divided by a cation exchange membrane. A hydroxide salt is produced in the catholyte. Neutralization of sugar acid solutions is maintained by back migration of hydroxide from the catholyte to the anolyte and by the addition of hydroxide from the catholyte to the anolyte.

The electrolytic reduction of sugar aldehydes has been employed in the production of sorbitol, xylitol and mannitol, as in U.S. Pat. Nos. 2,303,210, 2,507,973, and 2,537,304.

Electrolytic cells can be constructed in many different configurations. However, all previously disclosed examples of carbohydrate acid electrolytic decarboxylations and carbohydrate aldehyde reductions are carried out in either single- or double-compartment cells.

The aldehyde functionality of carbohydrate aldehydes are often reduced to alcohols to produce products of greater value. There remains a need for cost-effective methods to reduce or eliminate such a processing step.

SUMMARY

In one aspect, a method of simultaneously decarboxylating a carbohydrate acid and reducing a carbohydrate aldehyde in an electrochemical cell is disclosed. The method includes (A) providing an electrochemical cell having three compartments comprising an anode compartment, a central compartment, and a cathode compartment, the electrochemical cell further comprising a cation membrane positioned between and contacting the anode compartment and the central compartment, a bipolar membrane positioned between and contacting the central compartment and the cathode compartment, the cation membrane being configured to permit monovalent cation transfer, the cathode compartment containing a carbohydrate aldehyde, a catholyte and a cathode, and the anode compartment containing a carbohydrate acid, an anolyte, and an anode; and (B) providing an electrical current to the cell and producing a carbohydrate aldehyde in the anolyte, a monovalent cation hydroxide in the central compartment solution, and a sugar alcohol in the catholyte.

In some embodiments, the cathode comprises a ruthenium catalyst. In some embodiments, the carbohydrate aldehyde in the catholyte is produced by electrolytic decarboxylation of a carbohydrate acid. In some embodiments, the ratio of monovalent cation to carbohydrate acid maintains neutralization of the available carbohydrate acid for decarboxylation.

In some embodiments, the cation membrane is permeable to hydroxide ions to at least partially maintain the ratio of monovalent cation to carbohydrate acid. In some embodiments, the current efficiency for monovalent cation transfer across the cation membrane is less than 90%, preferably less than 80%, and more preferably less than 75%.

In some embodiments, the ratio of monovalent cation to carbohydrate acid is at least partially maintained by adding cation hydroxide selected from the group consisting of: sodium hydroxide, potassium hydroxide, lithium hydroxide, and ammonium hydroxide. In some embodiments, the monovalent cation hydroxide added to the anolyte is produced in the central compartment of the divided cell during the decarboxylation of a carbohydrate acid.

In some embodiments, the ratio of monovalent cation to carbohydrate acid is at least partially maintained by concurrently circulating the carbohydrate acid solution through two sets of electrolytic cells, where one set of cells is a divided cell with a cationic and bipolar membranes and the other is an undivided cell.

In some embodiments, the carbohydrate acid is selected from a group consisting of: arabinoic acid, d-gluconic acid, methyl-d-glucuronoside, d-glucuronic acid, d-galacturonic acid, 1-gulonic acid. In some embodiments, the carbohydrate acid is arabinonic acid. In some embodiments, the carbohydrate aldehyde in erythrose.

In some embodiments, the carbohydrate acid is produced using the hydroxide ion produced in the central compartment.

DETAILED DESCRIPTION OF THE PRESENTLY PREFERRED EMBODIMENTS

Definitions

As used herein, the term "carbohydrate acid" refers to any aldonic acid, uronic acid or aldaric acid.

"Aldonic acid" refers to any polyhydroxy acid compound comprising the general formula $HOCH_2[CH(OH)]_nC(=O)OH$ (where n is any integer, including 1-20, preferably 1-12, more preferably 4-7), as well as derivatives, analogs and salts thereof. Aldonic acids can be derived, for example, from an aldose by oxidation of the aldehyde function (e.g., D-gluconic acid).

"Uronic acid" refers to any polyhydroxy acid compound comprising the general formula $O=CH[CH(OH)]_nC(=O)OH$ (where n is any integer, including 1-20, preferably 1-12, more preferably 4-7), as well as derivatives, analogs and salts thereof. Uronic acids can be derived, for example, from an aldose by oxidation of the primary alcohol function (e.g., D-glucuronic acid).

"Aldaric acid" refers to any polyhydroxy acid compound comprising the general formula $HO(O=)C[CH(OH)]_nC(=O)OH$ (where n is any integer, including 1-20, preferably 1-12, more preferably 4-7), as well as derivatives, analogs and salts thereof. Aldaric acids can be derived, for example, from an aldose by oxidation of both the aldehyde function and the primary alcohol function (e.g., D-glucaric acid).

"Arabinonic acid" as used herein refers to an aldonic acid carbohydrate with chemical formula $C_5H_{10}O_6$, including any stereoisomers, derivatives, analogs and salts thereof. Unless otherwise indicated, recitation of "arabinonic acid" herein is intended to include, without limitation, the molecules: D-(−)-arabinonic acid, L(+)-arabinonic acid, D(−)-arabinonic acid, D-arabinonic acid, L-arabinonic acid, and D(−)-arabinonic acid and meso-arabinonic acid. Arabinonic acid is also referred to as arabonic acid and arabinoic acid.

"Gluconic acid" refers to an aldonic acid carbohydrate with chemical formula $C_6H_{12}O_7$, including derivatives, analogs and salts thereof. Unless otherwise indicated, recitation of "gluconic acid" herein is intended to refer to D-gluconic acid, D-(−)-gluconic acid, D(−)-gluconic acid.

"D-glucuronic acid" refers to an uronic acid carbohydrate with the chemical formula $C_6H_{10}O_7$ including derivatives, analogs, and salts thereof. Unless otherwise indicated, recitation of "d-glucuronic acid" herein is intended to include, without limitation, the molecules d-(−)-glucuronic acid, d-glucuronic acid, (alpha)-d-glucuronic acid, (beta)-d-glucuronic acid, and (alpha,beta)-d-glucuronic acid.

"Methyl-d-glucuronoside" refers to an uronic acid carbohydrate with the chemical formula $C_7H_{12}O_7$, including derivatives, analogs and salts thereof. Unless otherwise indicated, recitation of "methyl-d-glucuronoside" herein is intended to include, without limitation, the molecules 1-O-methyl-(alpha)-d-glucopyranosiduronic acid, 1-O-methyl-(beta)-d-glucopyranosiduronic acid and 1-O-methyl-(alpha,beta)-d-glucopyranosiduronic acid.

"D-galacturonic acid" refers to an uronic acid carbohydrate with the chemical formula $C_6H_{10}O_7$ including derivatives, analogs, and salts thereof. Unless otherwise indicated, recitation of "d-galacturonic acid" herein is intended to include, without limitation, the molecules d-(−)-d-galacturonic acid, d-galacturonic acid, (alpha)-d-galacturonic acid, (beta)-d-galacturonic acid, and (alpha,beta)-d-galacturonic acid.

"Carbohydrate aldehyde" refers to a polyhydroxy aldehyde compound comprising the general formula $HOCH_2[CH(OH)]_nC(=O)H$ or $(O=)CH[CH(OH)]_nC(=O)H$ (where n is any integer, including 1-20, but preferably 1-12, more preferably 3-6), as well as derivatives and analogs thereof. Carbohydrate aldehydes with one aldehyde group are often called aldoses, and carbohydrate aldehydes with two aldehyde groups are called dialdoses. Carbohydrate aldehydes can found in nature or they can be derived, for example, from the electrolytic decarboxylation of a carbohydrate acid.

"Erythrose" refers to an aldose (tetrose) carbohydrate aldehyde with chemical formula $C_4H_8O_4$, including any stereoisomers, derivatives and analogs thereof. Unless otherwise indicated, recitation of "erythrose" herein is intended to include, without limitation, the molecules: D-(−)-erythrose, L(+)-erythrose, D(−)-erythrose, D-erythrose, L-erythrose and D(−)-erythrose and meso-erythrose. A Fischer Projection of the D-erythrose structure (1) is provided below.

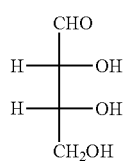

(1)

"Sugar alcohol" refers to any polyhydroxy alcohol compound comprising the general formula $HOCH_2[CH(OH)]_nCH_2OH$ (where n is any integer including 1-20, preferably 1-12, more preferably 4-7), as well as derivatives and analogs thereof. Sugar alcohols can be derived, for example, from an aldose by reduction of the aldehyde function.

"Erythritol" refers to a sugar alcohol carbohydrate with the formula $C_4H_{10}O_4$, including derivatives and analogues thereof. Erythritol is the sugar alcohol formed when the aldehyde of erythrose is reduced to an alcohol.

"Decarboxylation" as used herein refers to the removal of a carboxyl group (—COOH) by a chemical reaction or physical process. Typical products of a decarboxylation reaction may include carbon dioxide ($CO_2$) or formic acid.

"Reduction" as used herein refers to the chemical or physical process of transforming an aldehyde group (—CH=O) into an alcohol group (—$CH_2OH$).

The term "electrochemical" refers to chemical reactions that can take place at the interface of an electrical conductor (an electrode) and an ionic conductor (the electrolyte). Electrochemical reactions can create a potential between two conducting materials (or two portions of a single conducting material), or can be caused by application of external voltage. In general, electrochemistry deals with situations where an oxidation reaction and a reduction reaction are separated in space.

The term "electrolytic" as used herein refers to an electrochemical oxidation or reduction reaction that results in the breaking of one or more chemical bonds. Electrolytic reactions as used herein describe reactions occurring as a product of interaction with a cathode or anode.

As used herein, "derivative" refers to a chemically or biologically modified version of a chemical compound that is structurally similar to a parent compound and (actually or theoretically) derivable from that parent compound. A derivative mayor may not have different chemical or physical properties of the parent compound. For example, the derivative may be more hydrophilic or it may have altered reactivity as compared to the parent compound. Derivatization (i.e., modification) may involve substitution of one or more moieties within the molecule (e.g., a change in functional group) that do not substantially alter the function of the molecule for a desired purpose. The term "derivative" is also used to describe all solvates, for example hydrates or adducts (e.g., adducts with alcohols), active metabolites, and salts of the parent compound. The type of salt that may be prepared depends on the nature of the moieties within the compound. For example, acidic groups, for example carboxylic acid groups, can form, for example, alkali metal salts or alkaline earth metal salts (e.g., sodium salts, potassium salts, magnesium salts and calcium salts, and also salts quaternary ammonium ions and acid addition salts with ammonia and physiologically tolerable organic amines such as, for example, triethylamine, ethanolamine or tris-(2-hydroxyethyl)amine). Basic groups can form acid addition salts, for example with inorganic acids such as hydrochloric acid, sulfuric acid or phosphoric acid, or with organic carboxylic acids and sulfonic acids such as acetic acid, citric acid, benzoic acid, maleic acid, fumaric acid, tartaric acid, methanesulfonic acid or p-toluenesulfonic acid. Compounds which simultaneously contain a basic group and an acidic group, for example a carboxyl group in addition to basic nitrogen atoms, can be present as zwitterions. Salts can be obtained by customary methods known to those skilled in the art, for example by combining a compound with an inorganic or organic acid or base in a solvent or diluent, or from other salts by cation exchange or anion exchange.

As used herein, "analogue" refers to a chemical compound that is structurally similar to another but differs slightly in composition (as in the replacement of one atom by an atom of a different element or in the presence of a particular functional group), but may or may not be derivable from the parent compound. A "derivative" differs from an "analogue" in that a parent compound may be the starting material to generate a "derivative," whereas the parent compound may not necessarily be used as the starting material to generate an "analogue."

Any concentration ranges, percentage range, or ratio range recited herein are to be understood to include concentrations, percentages or ratios of any integer within that range and fractions thereof, such as one tenth and one hundredth of an integer, unless otherwise indicated. Also, any number range recited herein relating to any physical feature, such as polymer subunits, size or thickness, are to be understood to include any integer within the recited range, unless otherwise indicated. It should be understood that the terms "a" and "an" as used above and elsewhere herein refer to "one or more" of the enumerated components. For example, "a" polymer refers to one polymer or a mixture comprising two or more polymers. As used herein, the term "about" refers to differences that are insubstantial for the relevant purpose or function.

As used herein, the terms "substantially" or "about" with reference to a quantity includes variations in the recited quantity that are equivalent to the quantity recited, such as an amount that is equivalent to the quantity recited for an intended purpose or function.

Electrochemical Decarboxylation

The process of eletrolytically decarboxylating a carbohydrate acid in an electrochemical cell is described below. The electrochemical oxidative decarboxylation of a reactant substrate can be performed on the reactant substrate. In some embodiments, the methods include a step comprising electrolytic decarboxylation of the carbohydrate acid reactant to produce a carbohydrate aldehyde.

A reactant can be provided in a solution placed in contact with an electrode. The solution comprises the reactant and a solvent. The reactant can be dissolved in the solvent by any suitable method, including stirring, heating, or a combination thereof. The solvent can be any solvent in which the reactant can dissolve to a desired extent. Preferably, the solvent is aqueous.

In one embodiment, any suitable carbohydrate acid capable of producing a carbohydrate as a product of an electrolytic decarboxylation step can be used as a reactant. In one embodiment, the reactant is arabinonic acid as well as suitable derivatives, analogs and salts of the reactants. Suitable reactants include derivatives and analogs of the carbohydrate acid reactant can include reactants with chemical structure variations that insubstantially vary the reactivity of the molecule from undergoing an electrolytic decarboxylation process to produce either erythrose or an intermediate that can be converted to erythrose.

The decarboxylation reaction is performed electrochemically. In one aspect, electrolytic decarboxylation of a reactant in a solution can provide a desired product or intermediate that can be subsequently converted to the desired product. In some embodiments, the reactant is arabinonic acid, such as D- or L-arabinonic acid, and the product is an erythrose, such as D- or L-erythrose.

In some embodiments, at least about 5% of the acid can be neutralized. When an acid is neutralized, it exists as a corresponding salt rather than the acid itself. For example, the acid reactant solution can be provided with about 5, 10, 20, 30, 40, 50, 60, 70, 80, 90, or 100% of one or more reactant acids equivalents neutralized. In some embodiments, 10%-100% of at least one of ribonic acid or arabinonic acid reactant is neutralized.

In one aspect, the pH or percent neutralization can be provided or maintained within a desirable range throughout the reaction, for example by using a divided electrolytic cell with a cation exchange membrane and adding an alkali metal hydroxide to the anolyte. In another aspect, the pH or percent neutralization could be provided and/or maintained within a desirable range throughout the reaction, for example by simultaneously passing the anolyte through a first electrolytic cell and a second electrolytic cell, the first electrolytic cell being a divided electrolytic cell with a cation exchange membrane and the second electrolytic cell being a single compartment cell. The reactant carbohydrate acid solution can have any suitable pH to provide a desired concentration of dissociated reactant. For a reactant solution comprising an arabinonic acid reactant, the pH is can be between 3.0 and 6.0 prior to beginning the decarboxylation reaction.

Optionally, the residual reactant can be recycled by separating the starting material from products, for example by use of a cation exchange chromatographic resin. A partially decarboxylated solution of carbohydrate acid can contain both the starting carbohydrate acid (e.g., arabinonic acid) and the product (e.g., erythrose). A partially reacted solution can be passed over a bed or column of ion exchange resin beads for a chromatographic separation of the reactant and the product.

Electrochemical Reduction

In one embodiment, a process of electrolytically reducing a carbohydrate aldehyde in an electrochemical cell is described below. A step of electrochemical reduction of a reactant substrate can be performed on the reactant substrate. In some embodiments, the methods include a step of electrolytically reducing the aldehyde of a carbohydrate aldehyde to an alcohol.

A reactant can be provided as a solution placed in contact with an electrode. The solution includes the reactant and a solvent. The reactant can be dissolved in the solvent by any suitable method, including stirring, heating, or a combination thereof. The solvent can be any solvent in which the reactant can dissolve to a desired extent. Preferably, the solvent is aqueous. In one aspect the carbohydrate aldehyde is produced by the electrolytic decarboxylation of a carbohydrate acid.

In one embodiment, any suitable carbohydrate aldehyde capable of producing a sugar alcohol as a product of an electrolytic reduction step can be used as a reactant. In one embodiment, the reactant is erythrose as well as suitable derivatives and analogs thereof. Suitable reactants include derivatives and analogs of the carbohydrate aldehyde reactant can include reactants with chemical structure variations that insubstantially vary the reactivity of the molecule from undergoing an electrolytic reduction process to produce either erythritol or an intermediate that can be converted to erythritol.

The reduction reaction is performed electrochemically. In one aspect, electrolytic reduction of a reactant in a solution provides a desired product or intermediate that can be subsequently converted to the desired product. In some embodiments, the reactant is erythrose, and the product is erythritol.

Electrolytic Apparatus

The electrochemical decarboxylation of a carbohydrate acid reactant can be performed using a three-compartment electrolytic cell divided by a cation exchange membrane and a bipolar membrane. The electrochemical decarboxylation is performed by contacting a solution containing carbohydrate acid with an anode, where the reactant can be decarboxylated. Contact between the reactant material and the anode can elicit the decarboxylation, resulting in carbon dioxide and a product carbohydrate.

The cell includes an anode. The anode can be formed from any suitable material including but not limited to graphite, pyrolytic carbon, impregnated or filled graphite, glassy carbon, carbon cloth, or platinum. In some embodiments, the anode preferably comprises a carbon reactive surface where oxidation of the reactant acid can occur. In one embodiment, the anode surface comprises a highly crystalline graphitic material, such as a graphite foil. Other materials such as platinum or gold can also be used to form the anode's reactive surface. In one embodiment, the reactant carbohydrate acid is arabinonic acid and is oxidized at or near the anode's reactant surface forming erythrose.

The cell can also include a cation selective membrane dividing the anolyte from the central compartment and solution. The membrane can include, for example, heterogeneous or homogenous membranes. The latter can be a polymeric membrane with sulfonate or carboxylate ion exchange groups. The polymer could be hydrocarbon based or fluorocarbon based. As an example, Nafion® 115 (DuPont™ Fuel Cell) membrane is a perfluorosulfonic acid membrane that selectively transports cations.

The cell also includes a bipolar membrane dividing the catholyte from the central compartment and solution. The membrane is formed of an anion- and a cation-exchange layer that are bound together, either physically or chemically, and a thin interface where water diffuses from outside aqueous solutions. Hydronium and hydroxide ions obtained from the water splitting reaction can be transported out of the bipolar membrane if it is oriented correctly. With the anion-exchange side facing the anode and the cation-exchange side facing the cathode, hydroxyl anions can be transported across the anion-exchange layer and the hydrogen cations across the cation-exchange layer.

The cell can include a cathode where a reduction half-reaction can occur within the electrochemical cell. The cathode can be formed from any suitable material having a desired level of electrical conductivity, including but not limited to at least one of sponge nickel, nickel, ruthenium, lead amalgam, zinc amalgam, zinc, and stainless steel. In one embodiment, the decarboxylation reaction at the anode can be:

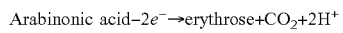
Arabinonic acid−2e⁻→erythrose+CO₂+2H⁺

The counter electrode reaction can be:

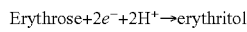
Erythrose+2e⁻+2H⁺→erythritol

Typically, some current can be lost to the production of O₂ gas at the anode and H₂ gas at the cathode.

In one aspect, a carbohydrate aldehyde is reduced at or near the surface of the cathode to a sugar alcohol. In one embodiment, the reactant carbohydrate aldehyde is erythrose and is reduced at or near the cathode's reactant surface forming erythritol. As the reaction proceeds, monovalent cations pass from the anolyte to the central compartment solution across a cation exchange membrane water is dissociated at the bipolar membrane, transporting hydroxide to the central compartment solution and act as the counter-ion to the monovalent cation, generating a monovalent cation hydroxide solution. In embodiment, the monovalent cation can be sodium or potassium. The hydronium ion transported to the catholyte by the bipolar membrane can regenerate the hydronium ion consumed as part of the reduction.

The electrochemical cell can be configured electrically in either a monopolar or bipolar configuration. In the monopolar configuration, an electrical contact is made to each electrode. In the bipolar configuration each electrode has a cathode and an anode side and electrical connection is made only to the electrodes positioned at the ends of the cell stack comprising multiple electrodes.

Alkali Oxidation of a Carbohydrate

In another aspect, the carbohydrate acid can be obtained from a suitable carbohydrate starting material by alkali oxidation. In one embodiment, the carbohydrate acid is arabinonic acid, which is prepared by oxidizing a starting material comprising glucose or fructose with oxygen gas in an alkaline water solution (for example, as described in U.S. Pat. No. 4,125,559 and U.S. Pat. No. 5,831,078, incorporated herein by reference). The starting material may include glucose, fructose, or a mixture thereof, and the starting material can be reacted with an alkali metal hydroxide and oxygen gas in aqueous solution by first heating the alkali metal hydroxide in aqueous solution at a temperature between about 30° C. and about 100° C. The starting material can be a D-hexose such as D-glucose, D-fructose or D-mannose, which can be present in various ring forms (pyranoses and furanoses) and as various diastereomers, such as (alpha)-D-glucopyranose and (beta)-D-glucopyranose. The starting material can be reacted with the alkali metal hydroxide in a stoichiometric amount, or in excess, using for example an amount of from 2 to 5 equivalents of the alkali metal per mole of the D-hexose. For example, alkali metal hydroxides may be sodium hydroxide or potassium hydroxide. The oxygen is preferably used in a stoichoimetric amount or in excess, but preferably with an amount of from about 1 to about 20 moles of O₂ per mole of the D-hexose starting material. The reaction can be carried out at above about 30° C., and under a pressure of about 1 to about 50 bars. The reaction may be performed continuously or batchwise, in a suitable solvent.

Alternatively, fructose (such as D-fructose) can be converted to D-arabinonic acid by reaction with oxygen gas in an alkaline water solution as described in J. Dubourg and P. Naffa, "Oxydation des hexoses reducteur par l'oxygene en milieu alcalin," *Memoires Presentes a la Societe Chimique*, p. 1353, incorporated herein by reference. The carbohydrate acid can also be obtained from the noble metal catalyzed alkali oxidation of aldoses and aldosides. In a particular embodiment, the carbohydrate acid is arabinonic acid, which can be prepared by oxidizing a starting material such as D- or L-arabinose with oxygen gas and a noble metal catalyst in an alkaline water solution, see Bright T. Kusema, Betiana C. Campo, Paivi Maki-Arvela, Tapio Salmi, Dmitry Yu. Murzin, "Selective catalytic oxidation of arabinose—A comparison of gold and palladium catalysts," *Applied Catalysis A: General* 386 (2010): 101-108, incorporated herein by reference.

Gluconic acid can be prepared by oxidizing glucose with oxygen gas and a noble metal catalyst in an alkali water solution, for example, as described in Ivana Dencicl, Jan Meuldijkl, Mart Croonl, Volker Hessel "From a Review of Noble Metal versus Enzyme Catalysts for Glucose Oxidation Under Conventional Conditions Towards a Process Design Analysis for Continuous-flow Operation," *Journal of Flow Chemistry* 1 (August 2011): 13-23, incorporated herein by reference. Methyl-d-glucuronopyranoside can be prepared by oxidizing glucose with oxygen gas and a noble metal catalyst in an alkali water solution, for example, as described in A. P. Markusse, B. F. M. Kuster, J. C. Schouten, "Platinum catalysed aqueous methyl-d-glucopyranoside oxidation in a multiphase redox-cycle reactor," *Catalysis Today* 66 (2001) 191-197, incorporated herein by reference.

The alkali metal hydroxide used for the preparation of the carbohydrate acid reactant can be produced in the cathode compartment of an electrolytic cell described herein during a prior or simultaneous decarboxylation of a carbohydrate acid.

EXAMPLES

Example 1

An experiment was performed in a three-compartment Microflow cell (ElectroCell Denmark) comprising a carbon anode (SGL Carbon), at cation exchange membrane (Astom CMB) a bipolar membrane (Astom BP-1E) and a cathode (Ru electrodeposited onto a Ni substrate). The feed solution started with 1.5M arabinonic acid, which was 100% neutralized to the sodium salt form, and 0.67M erythrose; this was pumped from a single reservoir through both the anolyte and catholyte compartments. The central compartment was initially fed a solution of 1M sodium hydroxide. A current density of 150 mA/cm2 was passed through the cell under constant current control until the required charge had been passed (measured using an ESC Model 640 digital coulometer). The neutralization of the arabinonic acid in the combined anolyte and catholyte streams was maintained between 5.3 and 5.4 with automated pH control by the addition of 10M NaOH. At the end of the experiment the arabonate and erythrose concentrations had dropped to 0.89M and 0.45M respectively. The erythritol concentration had increased from zero to 0.75M. All analyses were done on a Dionex Ultimate 3000 with pulsed amperometric detection (PAD) and quantified against known standards. The current efficiency for arabinonic acid oxidation to erythrose was 87%. The current efficiency of erythrose reduction to erythritol was 73%. Sodium hydroxide reached a final concentration of 3.4 M in the central compartment and was formed at a current efficiency of 68%.

STATEMENTS

1. A method of simultaneously decarboxylating a carbohydrate acid and reducing a carbohydrate aldehyde in an electrochemical cell, comprising:
   providing an electrochemical cell having three compartments comprising an anode compartment, a central compartment, and a cathode compartment, the electrochemical cell further comprising a cation membrane positioned between and contacting the anode compartment and the central compartment, a bipolar membrane positioned between and contacting the central compartment and the cathode compartment, the cation membrane being configured to permit monovalent cation transfer, the cathode compartment containing a carbohydrate aldehyde, a catholyte and a cathode, and the anode compartment containing a carbohydrate acid, an anolyte, and an anode;
   providing an electrical current to the cell and producing a carbohydrate aldehyde in the anolyte, a monovalent cation hydroxide in the central compartment solution, and a sugar alcohol in the catholyte;
2. The method of claim 1, wherein the cathode comprises a ruthenium catalyst.

3. The method of any one of claims 1 and 2, wherein the carbohydrate aldehyde in the catholyte is produced by electrolytic decarboxylation of a carbohydrate acid.

4. The method of any one of claims 1-3, wherein the ratio of monovalent cation to carbohydrate acid maintains neutralization of the available carbohydrate acid for decarboxylation.

5. The method of any one of claims 1-4, wherein the cation membrane is permeable to hydroxide ions to at least partially maintain the ratio of monovalent cation to carbohydrate acid.

6. The method of claim 5, wherein the current efficiency for monovalent cation transfer across the cation membrane is less than 90%, preferably less than 80%, and more preferably less than 75%.

7. The method of any one of claims 1-6, wherein the ratio of monovalent cation to carbohydrate acid is at least partially maintained by adding cation hydroxide selected from the group consisting of: sodium hydroxide, potassium hydroxide, lithium hydroxide, and ammonium hydroxide.

8. The method of claim 7, wherein the monovalent cation hydroxide added to the anolyte is produced in the central compartment of the divided cell during the decarboxylation of a carbohydrate acid.

9. The method of any one of claims 1-8 wherein the ratio of monovalent cation to carbohydrate acid is at least partially maintained by concurrently circulating the carbohydrate acid solution through two sets of electrolytic cells, where one set of cells is a divided cell with a cationic and bipolar membranes and the other is an undivided cell.

10. The method of any one of claims 1-9, wherein the carbohydrate acid is selected from a group consisting of: arabinoic acid, d-gluconic acid, methyl-d-glucuronoside, d-glucuronic acid, d-galacturonic acid, 1-gulonic acid.

11. The method of claim 10, wherein the carbohydrate acid is arabinonic acid.

12. The method of claim 11, wherein the carbohydrate aldehyde in erythrose.

13. The method of any one of claims 1-12, wherein the carbohydrate acid is produced using the hydroxide ion produced in the central compartment.

We claim:

1. A method of simultaneously decarboxylating a carbohydrate acid and reducing a carbohydrate aldehyde in an electrochemical cell, comprising:
   providing an electrochemical cell having three compartments comprising an anode compartment, a central compartment, and a cathode compartment, the electrochemical cell further comprising a cation membrane positioned between and contacting the anode compartment and the central compartment, a bipolar membrane positioned between and contacting the central compartment and the cathode compartment, the cation membrane being configured to permit monovalent cation transfer, the cathode compartment containing a carbohydrate aldehyde, a catholyte and a cathode, and the anode compartment containing a carbohydrate acid, an anolyte, and an anode;
   providing an electrical current to the cell and producing a carbohydrate aldehyde in the anolyte, a monovalent cation hydroxide in the central compartment solution, and a sugar alcohol in the catholyte.

2. The method of claim 1, wherein the cathode comprises a ruthenium catalyst.

3. The method of claim 1, wherein the carbohydrate aldehyde in the catholyte is produced by electrolytic decarboxylation of a carbohydrate acid.

4. The method of claim 1, wherein a ratio of monovalent cation to carbohydrate acid in the anolyte maintains neutralization of the available carbohydrate acid for decarboxylation.

5. The method of claim 1, wherein the cation membrane is permeable to hydroxide ions to at least partially maintain a ratio of monovalent cation to carbohydrate acid in the anolyte.

6. The method of claim 5, wherein the current efficiency for monovalent cation transfer across the cation membrane is less than 90%, preferably less than 80%, and more preferably less than 75%.

7. The method of claim 1, wherein a ratio of monovalent cation to carbohydrate acid in the anolyte is at least partially maintained by adding cation hydroxide selected from the group consisting of: sodium hydroxide, potassium hydroxide, lithium hydroxide, and ammonium hydroxide.

8. The method of claim 7, wherein the monovalent cation hydroxide added to the anolyte is produced in the central compartment of the divided cell during the decarboxylation of a carbohydrate acid.

9. The method of claim 1, wherein a ratio of monovalent cation to carbohydrate acid in the anolyte is at least partially maintained by concurrently circulating the carbohydrate acid solution through two sets of electrolytic cells, where one set of cells is a divided cell with a cationic and bipolar membranes and the other is an undivided cell.

10. The method of claim 1, wherein the carbohydrate acid is selected from a group consisting of: arabinoic acid, d-gluconic acid, methyl-d-glucuronoside, d-glucuronic acid, d-galacturonic acid, 1-gulonic acid.

11. The method of claim 10, wherein the carbohydrate acid is arabinonic acid.

12. The method of claim 11, wherein the carbohydrate aldehyde contained in the cathode compartment and produced in the anolyte is erythrose.

13. The method of claim 11, wherein the arabinonic acid is prepared by oxidizing a starting material comprising glucose or fructose with oxygen gas in an alkaline water solution.

14. The method of claim 1, wherein the carbohydrate acid is produced using the hydroxide ion produced in the central compartment.

15. The method of claim 1, wherein the anode comprises a material selected from graphite, pyrolytic carbon, impregnated or filled graphite, glassy carbon, carbon cloth, and platinum.

16. The method of claim 1, wherein the anode comprises graphite foil.

17. The method of claim 1, wherein the cation membrane is a perfluorosulfonic acid membrane.

* * * * *